UNITED STATES PATENT OFFICE

JAMES N. WHITMAN, OF PHILADELPHIA, PENNSYLVANIA, ASSIGNOR OF ONE-HALF TO MARCUS T. REYNOLDS, OF ALBANY, NEW YORK.

PROCESS OF TREATING FINE ORES.

978,971.

Specification of Letters Patent. Patented Dec. 20, 1910.

No Drawing. Application filed February 16, 1906. Serial No. 301,454.

*To all whom it may concern:*

Be it known that I, JAMES N. WHITMAN, a citizen of the United States, residing in Philadelphia, in the county of Philadelphia and State of Pennsylvania, have invented a new and useful Process of Treating Fine Ores, of which the following is a specification.

This invention relates to processes of treating fine ores and iron oxids, such as concentrates, blast furnace flue dust, pyrites residues, etc.

The object of the invention is to make available iron bearing ores that are now comparatively valueless because of the finely divided state in which said ores exist in their natural condition, or, after their comminution for the purpose of mechanical purification, or, after their comminution during the extraction of elements other than the iron contained therein.

As a preliminary step to the commercial utilization of ores of the character mentioned, it is necessary to change the mechanical characteristic, as for instance by an agglomeration, into definite masses of appreciable size, and in accordance with the present invention the fine particles of the sand ores are agglomerated or assembled into nodules by being subjected to a proper degree of heat preferably in a rotary furnace.

Heretofore, various attempts have been made to successfully treat ores of this character and render the same available for commercial uses, especially in blast furnaces, but these attempts have usually been in the direction of adding fluxing material more easily fused than the iron content of the ore, with the object in view of reducing the heat necessary to agglomerate or bind the fine particles together in masses of appreciable size, whereas in my present invention, I propose to use basic additions, only when needed for the further elimination of impurities and objectionable material contained in the ores under treatment, and consequently the invention contemplates a treatment of the ore in its natural or normal condition and in such manner to utilize the natural and normal gangue as the agglomerating or nodulizing material. The present process, therefore, obviates the necessity of mixing a separate fluxing material with the ore as it utilizes the impurities normally contained therein, such as silica, alumina, lime, magnesia, etc., a very small percentage of these impurities being all sufficient to form a binding agent for the mass when treated in accordance with the present invention.

As a preliminary but inseparable step in the present process, the ore is subjected to a degree of heat which will suffice to eliminate such impurities as may be of a volatile nature and particularly sulfur and phosphorus without any special addition, or where necessary, by using only a sufficient quantity of basic material (such as lime or its equivalents which are carried in the agglomerate in quantity sufficient to furnish an excess of basic material closely combined) to prevent reabsorption in subsequent metallurgical operations.

To effect agglomeration, the ore is heated approximately to the fusing point of its silica content say from 2000° to 2400° Fahrenheit, although the temperature will vary to some extent depending upon the character of the material, and by the agitation of the mass, nodules, well adapted for future metallurgical operations, are produced.

In the practical operation of the process, use has been made of apparatus similar in construction to apparatus used in the manufacture of cement, that is to say, a rotary furnace in which the ore is subjected to a temperature necessary to eliminate impurities and then to a higher temperature to effect the agglomeration and nodulization of the ore by the fusing of certain or all of the elements of its gangue content to form a binder, and by the agitation due to the rotation of the furnace, the mass is not only more effectually subjected to the action of the atmosphere and products passing through the furnace, but is formed into a purified body of nodules of appreciable size.

This process eliminates impurities contained in the ore, agglomerates the ore without the addition of slag forming material and leaves the agglomerated nodules in a more open and porous condition whereby they will be more readily permeated by the reducing gases of the succeeding metallurgical operations.

The employment of a rotary furnace through which the ore is passed from the cooler to the hotter end, results in a control of the temperature by the action of the ore itself, inasmuch as the cooled ore will reduce the temperature at the entering end to a point where the desulfurization and purification proceeds as a step which gradually merges into the process of agglomeration without a definite line of demarkation between the stages, although it will be understood that the invention may be carried into effect by changing the temperature in the furnace to accomplish the ends desired and without controlling said temperature by the introduction of new and cold material.

Practice has demonstrated that the ores to be treated in accordance with this process may be either in a wet or dry condition although it is preferred that they shall be wet when introduced into the furnace.

What I claim is:

1. The process of agglomerating fine iron ores or residues, which consists in first moistening the mass and then subjecting the same to a temperature which shall cause the particles thereof, due to the impurities contained therein, to fuse sufficiently to become semiplastic and sticky, and to agitate by rolling the mass when in the semiplastic state.

2. The process of agglomerating fine iron ores or residues which consists in first moistening and then subjecting the same to a temperature which shall cause the particles thereof to fuse sufficiently to become semiplastic and sticky and to agitate by rolling the same when in the semiplastic state.

JAMES N. WHITMAN.

Witnesses:
ALEXANDER S. STEUART,
THOMAS DURANT.